(12) United States Patent
Gros et al.

(10) Patent No.: US 7,736,538 B2
(45) Date of Patent: Jun. 15, 2010

(54) MIXTURE FOR APPLYING A NON-CORROSIVE, POLYMER COATING WHICH CAN BE SHAPED IN A LOW-ABRASIVE MANNER, AND METHOD FOR PRODUCING THE SAME

(75) Inventors: Georg Gros, Oppenau (DE); Norbert Maurus, Langen (DE); Marcus Schinzel, Eppstein (DE)

(73) Assignee: Chemetall GmbH, Frankfurt (DE)

( * ) Notice: Subject to any disclaimer, the term of this patent is extended or adjusted under 35 U.S.C. 154(b) by 1330 days.

(21) Appl. No.: 10/511,242

(22) PCT Filed: Apr. 17, 2003

(86) PCT No.: PCT/EP03/04057

§ 371 (c)(1),
(2), (4) Date: May 23, 2005

(87) PCT Pub. No.: WO03/089507

PCT Pub. Date: Oct. 30, 2003

(65) Prior Publication Data

US 2006/0058423 A1 Mar. 16, 2006

(30) Foreign Application Priority Data

Apr. 20, 2002 (DE) ................. 102 17 624
Oct. 12, 2002 (DE) ................. 102 47 691
Dec. 3, 2002 (DE) ................. 102 56 286

(51) Int. Cl.
  C09D 5/10   (2006.01)
  C09D 5/08   (2006.01)
  C09D 5/24   (2006.01)
  B05D 1/12   (2006.01)
  H01B 1/22   (2006.01)

(52) U.S. Cl. .............. 252/500; 252/512; 252/518.1; 252/519.1; 252/502; 252/510; 428/323; 428/208; 428/423.1; 428/353; 427/202; 427/180; 427/208; 427/384; 427/386; 219/91.21; 204/488

(58) Field of Classification Search ............. 252/503, 252/504, 518.1, 519.1, 511; 106/14.4, 14.3; 427/327, 386, 388.1, 485; 428/323, 327, 428/355 N; 219/91.2; 524/399, 437
See application file for complete search history.

(56) References Cited

U.S. PATENT DOCUMENTS

| 3,175,991 A | 3/1965 | Morris et al. |
| 3,562,124 A | 2/1971 | Leon et al. |
| 3,849,141 A | 11/1974 | Palm et al. |
| 3,990,437 A | 11/1976 | Boyden et al. |
| 4,070,323 A | 1/1978 | Vanderhoff et al. |
| 4,139,385 A | 2/1979 | Crivello |
| 4,213,837 A | 7/1980 | Bristowe et al. |
| 4,228,438 A | 10/1980 | Vazirani |
| 4,626,283 A | 12/1986 | Martins et al. |
| 4,628,004 A | 12/1986 | Nickola et al. |
| 4,724,172 A | 2/1988 | Mosser et al. |
| 4,851,460 A | 7/1989 | Stranghoner et al. |
| 4,876,160 A | 10/1989 | Chindou et al. |
| 4,896,250 A | 1/1990 | Sullivan |
| 4,939,034 A * | 7/1990 | Sobata et al. ............... 428/336 |
| 4,981,759 A | 1/1991 | Nakatani et al. |
| 5,001,173 A | 3/1991 | Anderson et al. |
| 5,069,966 A | 12/1991 | Colaiacovo et al. |
| 5,071,593 A | 12/1991 | Takahashi et al. |
| 5,073,585 A | 12/1991 | Neubert |
| 5,126,768 A | 6/1992 | Nozawa et al. |
| RE34,116 E | 10/1992 | Shindou et al. |

(Continued)

FOREIGN PATENT DOCUMENTS

AU      742771      5/1999

(Continued)

OTHER PUBLICATIONS

Titanium Dioxide, "DuPont Ti-Pure R-900"; Data Sheet, 2007.*

(Continued)

*Primary Examiner*—Stanley Silverman
*Assistant Examiner*—Kallambella Vijayakumar
(74) *Attorney, Agent, or Firm*—Fulbright & Jaworski LLP

(57) ABSTRACT

The invention relates to a mixture for applying a polymer, non-corrosive, electroconductive coating which can be shaped in a low-abrasive manner, to a base. Said mixture contains at least one substance A in the form of electroconductive hard particles, at least one substance B in the form of very soft or soft, inorganic, sliding, electroconductive or semiconductive particles, and/or at least one substance C in the form of metallic, soft or hard, electroconductive or semiconductive particles and/or soot, and optionally other constituents such as an anticorrosion pigment D, the sum of the parts by weight of the inorganic sliding particles B and the metallic particles and/or soot C amounting to between 0.25 and 99.5% of the parts by weight of the water-insoluble or only slightly water-soluble pigmentation S (A+B+C), and the size of the electroconductive hard particles A amounting to less than 10 ?m in relation to the particle size transfer value $d_{99}$. The invention also relates to a method for producing a non-corrosive, viscoplastic coating on a base, said coating containing polymer and inorganic particles, and to an electroconductive coating containing polymer and inorganic particles.

8 Claims, No Drawings

U.S. PATENT DOCUMENTS

| | | | |
|---|---|---|---|
| 5,501,942 A | 3/1996 | Salvin et al. | |
| 5,578,669 A | 11/1996 | Odawa et al. | |
| 5,594,065 A | 1/1997 | Tien et al. | |
| 5,712,034 A | 1/1998 | Stevens et al. | |
| 5,750,249 A | 5/1998 | Wasowicz et al. | |
| 5,753,740 A | 5/1998 | Odawa et al. | |
| 5,834,128 A | 11/1998 | Hamahara et al. | |
| 5,853,890 A | 12/1998 | Odawa et al. | |
| 5,855,820 A | 1/1999 | Chan et al. | |
| 5,922,119 A | 7/1999 | Gijsbert | |
| 5,976,419 A | 11/1999 | Hawkins et al. | |
| 6,001,469 A | 12/1999 | Verardi et al. | |
| 6,008,462 A * | 12/1999 | Soltwedel | 219/91.2 |
| 6,054,514 A | 4/2000 | Kulkarni | |
| 6,146,706 A | 11/2000 | Verardi et al. | |
| 6,156,416 A | 12/2000 | Daems et al. | |
| 6,197,366 B1 * | 3/2001 | Takamatsu | 427/125 |
| 6,211,262 B1 | 4/2001 | Mejiritski et al. | |
| 6,284,817 B1 | 9/2001 | Bennington et al. | |
| 6,332,291 B1 | 12/2001 | Flosbach et al. | |
| 6,472,026 B1 | 10/2002 | Maag et al. | |
| 6,479,103 B1 * | 11/2002 | Wichelhaus et al. | 427/327 |
| 6,605,669 B2 | 8/2003 | Awokola et al. | |
| 6,715,196 B2 | 4/2004 | Reising et al. | |
| 6,716,891 B1 | 4/2004 | Meisenburg et al. | |
| 6,740,365 B2 | 5/2004 | Awokola et al. | |
| 6,747,088 B1 | 6/2004 | Schwalm et al. | |
| 6,794,422 B1 | 9/2004 | Bruchmann et al. | |
| 6,855,403 B2 | 2/2005 | Tysak | |
| 7,022,175 B2 | 4/2006 | Marten | |
| 7,118,690 B2 | 10/2006 | Wessling et al. | |
| 7,312,255 B2 | 12/2007 | Gros | |
| 2002/0088373 A1 | 7/2002 | Marten | |
| 2003/0143078 A1 | 7/2003 | Benedetto et al. | |
| 2003/0175541 A1 | 9/2003 | Lorenz et al. | |
| 2006/0058423 A1 | 3/2006 | Gros et al. | |

FOREIGN PATENT DOCUMENTS

| | | |
|---|---|---|
| CA | 2305563 | 8/2000 |
| DE | 26 10 437 | 9/1976 |
| DE | 34 12 234 A1 | 10/1985 |
| DE | 37 27 112 A1 | 2/1989 |
| DE | 196 18 435 C1 | 5/1997 |
| DE | 198 18 735 A1 | 10/1999 |
| DE | 199 47 522 A1 | 4/2001 |
| DE | 100 58 118 A1 | 5/2002 |
| EP | 0 081 323 | 6/1983 |
| EP | 0 104 838 A2 | 4/1984 |
| EP | 0 298 409 B1 | 1/1989 |
| EP | 0 309 286 A | 3/1989 |
| EP | 0 328 047 A | 8/1989 |
| EP | 0 344 129 B1 | 11/1989 |
| EP | 0 659 855 A2 | 6/1995 |
| EP | 0 742 239 A1 | 11/1996 |
| EP | 0 761 320 B1 | 3/1997 |
| GB | 2 040 977 | 9/1980 |
| JP | 50-45740 | 4/1975 |
| JP | 57-192405 | 11/1982 |
| JP | 10-249357 | 9/1998 |
| WO | WO 89/05476 | 5/1989 |
| WO | WO 96/29372 | 9/1996 |
| WO | WO 98/51746 | 11/1998 |
| WO | WO 9850601 A1 * | 11/1998 |
| WO | WO 99/24515 * | 5/1999 |
| WO | WO 99/24545 | 5/1999 |
| WO | WO 99/26728 A2 | 6/1999 |
| WO | WO 00/73395 A1 | 12/2000 |
| WO | WO 01/23453 | 4/2001 |
| WO | WO-01/30923 A2 | 5/2001 |

OTHER PUBLICATIONS

AAA AL-130 Data Sheet, www.micronmetals.com.
Schaeffer "Radiation curable oligomers combining superior wear properties with enhanced chemical and moisture resistance", Sartomer Company, Inc. (Jul. 2005).
U.S. Appl. No. 10/511,222, Gros, et al.
U.S. Appl. No. 10/467,927, filed Oct. 30, 2003, Gros, et al.
U.S. Appl. No. 09/980,182, filed Jan. 7, 2002, Gros et al.
U.S. Appl. No. 10/511,223, Gros, et al.

* cited by examiner

MIXTURE FOR APPLYING A NON-CORROSIVE, POLYMER COATING WHICH CAN BE SHAPED IN A LOW-ABRASIVE MANNER, AND METHOD FOR PRODUCING THE SAME

This is a §371 of PCT/EP03/04057 filed Apr. 17, 2003, which claims priority from German 102 17 624.8 filed Apr. 20, 2002, German 102 47 691.8 filed Oct. 12, 2002 and German 102 56 286.5 filed Dec. 3, 2002, each of which are hereby incorporated by reference in their entireties.

The present invention relates to a mixture for applying a polymeric, corrosion-resistant, electrically conductive coating which can be shaped in a low-abrasive manner to a substrate, in particular a metallic substrate, such as e.g. a steel sheet, which has optionally been coated beforehand with zinc or a zinc-containing alloy and then optionally coated with a pretreatment. The coating is to serve, in particular, as a welding primer.

In mass production, welding primers of the $1^{st}$ generation which, for reasons of corrosion protection, contain chromium are currently employed in automobile construction because to date it is very difficult to employ equivalent and at the same time environment-friendlier constituents instead of chromium-containing compounds in corrosion protection. The electrical conductivity of the polymeric coatings, which are about 2.5 to 9 µm thick, which is necessary for electrical welding is acquired by a very high content of pulverulent metallic zinc embedded in a polymeric matrix. However, because of moisture in any polymeric coating, metallic zinc tends to oxidize rapidly, with formation of white efflorescences (white rust). By the oxidation of the zinc powder, however, the corrosion-protective action and the electrical conductivity of the metallic zinc can be gradually used up with progressive formation of white rust. In addition, only certain requirements in respect of electrical weldability are imposed on the welding primers of the first generation of limited corrosion resistance. It is sufficient if 600 welding points can be set by a welding machine through two steel sheets about 0.5 to 2.0 mm thick which are lying on one another and are coated on both sides before the welding electrodes have to be reworked or replaced. The structure of the coatings on the steel sheets in this context typically comprises first a layer of zinc or a zinc alloy about 2 to 7.5 µm thick, a pretreatment layer about 0.01 to 1.0 µm thick on top of this and finally a welding primer layer of a thickness significantly below 10 µm thick. With in each case three different coatings applied on one another and in each case double-sided, there are therefore in total 2 sheets with 12 layers to be through-plated for each welding point.

However, far higher requirements are imposed on welding primer coatings of the 2nd generation for use in automobile construction: 1.) The corrosion resistance of a flange of two metal sheets should be higher by a factor of about three, in spite of the absence of chromium, since here it is required that an extremely aggressive corrosion protection alternating test in accordance with VDA 621-415 with 20, instead of only 10, cycles each of a duration of one week with salt spray tests, condensation water tests and recondensation is passed successfully without the appearance of red rust. Over the test duration of 20 weeks, the test has a progressively more severe effect. 2.) During electrical welding, the number of welding points which can be achieved with a welding machine should accordingly be at least 1,200, instead of only 600, before the welding electrodes are replaced or reworked. 3.) For gluing, which is used instead of welding to an ever increasing degree in automobile construction, it is necessary for the requirements of adhesive strength between the substrate and the zinc-containing coating, between the zinc-containing coating and the pretreatment layer, between the pretreatment layer and the welding primer layer and between the welding primer layer and the adhesive layer also to be at least as high as in the case of the $1^{st}$-generation welding primers, the $1^{st}$-generation welding primers often being applied more thinly (2.5 to 3 µm, but then free from electrically conductive hard particles) than the foreseeable $2^{nd}$-generation welding primers because of the high corrosion requirements, and the adhesive strength requirements also increasing with the layer thickness. 4.) Furthermore, it would be advantageous if the welding primers were to prove to be outstanding also with other types of welding instead of resistance welding, since the use of alternative welding technology is also being worked on intensively. It is hoped that by this means the labour-intensive and expensive sealing of hollow cavities and, where appropriate, also the sealing of seams can also be dispensed with using the 2nd generation welding primers.

It is moreover necessary that metal sheets which are coated with welding primer and are processed in automobile construction can be shaped without problems. A bordering, beading, deep-drawing or/and pressing in large presses in a low-abrasive manner in which the corresponding tool is not worked off too severely and too rapidly and the welding primer coating is not destroyed, eroded, torn off or seriously damaged is necessary in particular here. This applies in particular to the inorganic contents in the welding primer which are bonded into an organic matrix.

The publications of the prior art on electrically conductive optionally weldable coatings which comprise at least one resin often describe the use of graphite, carbon black, aluminium, nickel, zinc or/and ferro-alloys, such as e.g. iron phosphides based on mixtures of FeP, $Fe_2P$ and evidently unavoidable impurities. The iron phosphides are conventionally based on Ferrophos® powders from Occidental Chemical Corp. (=OxyChem, formerly Hooker Chem. and Plastics Corp.), of which the grades HRS 2132 and HRS 3095 have an average particle size of 3.3 µm and 2.8 µm respectively, according to the manufacturer, but comprise a considerable content of over-sized particles, which can be seen from the particle size passage value $d_{99}$ of 16 µm and 12 µm respectively. All of the publications known to the Applicant which mention iron phosphide as an additive for coating mixtures are based on these Ferrophos® powders. These powder grades are evidently employed in the non-ground form in all these publications, since grinding operations are at best carried out in a mixture of at least three components, mixing with one another often being of primary importance, but the particle sizes are to be scarcely reduced, if at all. As is known, the grinding operations for the preparation of lacquers and similar coatings are often only mixing processes or grinding operations of comparatively low intensity, since they are usually carried out in an organic suspension with a comparatively low iron phosphide content. Since iron phosphides are hard and brittle, they require vigorous grinding without the presence of any or in the presence of as small an amount as possible of substances which impair the grinding action. Furthermore, grinding of finely divided phosphides is not without risk.

The doctrine of U.S. Pat. No. 6,008,462 is liquid coating compositions for weldable primers which are resistant to sea water and have a content of metallic iron particles. The introduction to the description of this patent specification describes problems which occur when using iron phosphides in primer coatings and which are also mentioned similarly in U.S. Pat. No. 5,260,120. These include the exceptionally abrasive action of the iron phosphide particles on tools and the high coefficient of friction of such coatings. In these publications, these problems are solved by employing iron particles instead of iron phosphide particles in the primer coating or by additionally applying a thin polymeric topcoat to the coating comprising iron phosphide particles, which is said not to impair the weldability of metal sheets coated in this way too severely.

U.S. Pat. No. 4,889,773 describes electrodes for resistance welding which have a coating of binder and at least one phosphide, preferably based on iron phosphides. This coating is not aimed at the high requirements of welding primer coatings.

The doctrine of U.S. Pat. No. 4,110,117 is coating compositions comprising zinc, aliphatic polyol silicates and in some cases also iron phosphide.

U.S. Pat. No. 4,011,088 protects purely inorganic coatings based on particles of iron phosphide or/and nickel phosphide which are embedded in a water-soluble silicate binder.

WO 96/29372 relates to compositions which, in addition to binder resin, comprise zinc, graphite and optionally further components, such as e.g. iron phosphide.

In scanning electron microscopy analysis of welding primer coatings on metallic substrates on which the welding primer coating is to be less than 9 µm, it is striking that over-sized iron phosphide particles not only lead to a coating which appears inhomogeneous, but also form troublesome peaks which project out of the coating and give rise to severe abrasion during shaping. Initial shaping experiments using iron phosphide powder grades added in the non-ground form showed a considerable abrasion and a lack of suitability for shaping in series production.

There was therefore the object of proposing coatings which are suitable for shaping, e.g. of steel sheets such as are processed, for example, in the automobile industry, in a low-abrasive manner in series production. In spite of the coating on one or even both sides, e.g. 1.) with zinc or a zinc-containing alloy, 2.) with a thin pretreatment layer which is a corrosion protection and an adhesive base for the subsequent primer, and 3.) with a 0.5 to 10 µm thick welding primer coating, these coatings should be sufficiently electrically conductive to be readily weldable. The process for the production of the welding primer coating should moreover be as simple as possible, suitable for series production and inexpensive.

The object is achieved with a mixture for applying a polymeric, corrosion-resistant, electrically conductive coating which can be shaped in a low-abrasive manner to a substrate, in particular to a metallic substrate such as e.g. a steel sheet, it being possible for the substrate optionally to be precoated e.g. with at least one zinc layer or/and a zinc-containing alloy layer or/and with at least one pretreatment layer, wherein the mixture comprises, in addition to at least one substance A in the form of electrically conductive hard particles, at least one substance B in the form of very soft or soft, inorganic, electrically conductive or semiconducting particles which are capable of sliding, such as e.g. graphite, or/and at least one substance C in the form of metallic, soft or hard, electrically conductive or semiconducting particles or/and carbon black and at least one binder and in each case at least one crosslinking agent or/and one photoinitiator and optionally also in each case at least one post-crosslinking compound, one additive, one corrosion protection pigment D, one corrosion inhibitor which is not present in particle form, one organic solvent or/and water, A, B and C being water-insoluble or sparingly water-soluble pigments, the sum of the weight contents of the inorganic particles B which are capable of sliding and of the metallic particles or/and carbon black C making up 0.25 to 95% of the weight contents of the water-insoluble or sparingly water-soluble pigmentation $\Sigma(A+B+C)$ and the size of the electrically conductive hard particles A, based on the passage value $d_{99}$ measured with a Mastersizer of type S from Malvern Instruments, being less than 10 µm. The object is based on a preparation of the suspension such as is described in the examples and comparison examples.

The subject matter of the patent applications DE 102 47 691 and DE 102 56 286 is expressly included in this Application in respect of the information on the examples, comparison examples, testing techniques, particle-related data, such as e.g. nature, size, size distributions and properties, and on the properties and compositions of the mixtures and coatings and on the coatings and process steps.

The substrate can be, in particular, one of steel, of high-grade steel, of at least one aluminium or/and magnesium alloy, in the form of sheets, plates, rods or parts of complicated shape or already joined components. Sheets of an aluminium alloy or steel are preferred.

The coating can be applied to the substrate to any desired extent, e.g. to only one or to both sides, e.g. of a metal sheet, optionally including at least one edge or only in a certain width or in a certain pattern, so that e.g. edge regions can remain uncoated.

The electrically conductive hard particles A are water-insoluble or sparingly water-soluble. They serve, inter alia, as barrier particles, without themselves having to be particularly corrosion-resistant. Nevertheless, it is preferable for the particles A to be somewhat more stable to chemicals or/and more corrosion-resistant, in particular to water and weakly basic media.

The electrically conductive hard particles A are chosen in particular from those based on boride, carbide, oxide, phosphide, phosphate, silicate or/and silicide. They are preferably such compounds based on aluminium, chromium, iron, calcium, magnesium, manganese, nickel, cobalt, copper, lanthanum, lanthanide, molybdenum, niobium, tantalum, titanium, vanadium, tungsten, yttrium, zinc, tin or/and zirconium. Their electrical conductivity can optionally be substantially based on a particular doping addition or/and content of a further phase of better electrical conductivity or/and of a coating of better electrical conductivity. Particularly preferred substances are iron phosphate, manganese phosphate, nickel phosphate, zinc phosphate or/and further phosphates based on aluminium, iron, copper, manganese, nickel, zinc or/and further transition metals, phosphides based on iron, manganese, molybdenum, nickel, titanium, zirconium or/and optionally further transition metals, borides based on titanium or/and other transition metals, carbides of elevated electrical conductivity, such as e.g. silicon carbide of particularly high electrical conductivity or silicides, such as e.g. based on molybdenum or/and other transition metals.

Compounds which are particularly preferred here are oxides of high electrical conductivity, in particular oxides having a structural chemistry based on at least one spinel, such as e.g. $Fe_3O_4$ or $(Cu, Fe, Mn, Ni, Ti, Zn)_3O_4$, based on at least one oxide having a below-stoichiometric oxygen content and of comparatively high electrical conductivity, such as e.g. $SnO_{2-x}$ or $TiO_{2-x}$, where x is e.g. in the range from 0.02 to 0.25, or based on at least one phosphide which, in particular, can be attacked to only a small degree or cannot be attacked by water and dilute acids and has a relatively high electrical conductivity. The graphite is preferably microcrystalline and contains, in particular, more than 97.0 wt. % C.

In the mixture according to the invention, the electrically conductive hard particles A can comprise substances based on compounds or mixtures of compounds with or of spinels, such as e.g. $Fe_3O_4$, $Mn_3O_4$, $FeMn_2O_4$ or/and further substances based on borides, carbides, oxides, phosphates, phosphides, silicates, silicides, in particular of transition metals, or particles having an electrically conductive coating or/and a mixture thereof or a common compound thereof, and optionally further metallic particles or/and carbon black C chosen from aluminium, iron, cobalt, copper, molybdenum, nickel, niobium, silver, tantalum, titanium, vanadium, tungsten, zinc, tin, aluminium-, iron-, cobalt-, copper-, molybdenum-, nickel-, niobium-, silver-, tantalum-, titanium-, vanadium-, tungsten-, zinc- or/and tin-containing alloys, in particular oxides substantially based on spinels, preferably of aluminium, chromium, iron, cobalt, copper, magnesium, manganese, nickel, vanadium, titanium or/and zinc or/and substantially based on electrically conductive oxides having a below-stoichiometric oxygen content, such as e.g. $TiO_{1.95}$, or/and in particular phosphides substantially based on aluminium, iron, cobalt, copper, manganese, molybdenum, nickel, niobium, tantalum, titanium, vanadium, tungsten, zinc or/and tin, in particular based on phosphides, preferably based on iron-, manganese-, nickel- or/and tin-containing phosphides. Particles having an electrically conductive coating which are suitable in particular are those which have an electrical conductivity of at least that of metallic zinc, in particular particles coated with graphite, carbon black, another type of carbon, electrically conductive metal, iron oxide, antimony compound(s) or/and tin compound(s).

In the mixture according to the invention, the sum of the weight contents of the inorganic particles B which are capable of sliding and the metallic particles or/and carbon black C can preferably make up 0.8 to 98% of the weight contents of the water-insoluble or sparingly water-soluble pigmentation $\Sigma(A+B+C)$, particularly preferably at least 1.5% or at least 4.5%, very particularly preferably at least 8% or at least 14%, in particular at least 26% or particularly preferably not more than 96% or not more than 90%, very particularly preferably not more than 84% or not more than 78%, in particular not more than 66%. On the other hand, in the case of another fundamental type of the embodiment of the combination of the various particle types, it may also be advantageous if the sum of the weight contents of the inorganic particles B which are capable of sliding and the metallic particles or/and carbon black C preferably makes up 0.8 to 98% of the weight contents of the water-insoluble or sparingly water-soluble pigmentation $\Sigma(A+B+C)$ not more than 50%, preferably not more than 44%, particularly preferably not more than 36% or not more than 28%, very particularly preferably not more than 22% or not more than 16%, in particular not more than 12%. The lower the content of the electrically conductive hard particles A in the mixture, the more it is preferable to employ particles A of better electrical conductivity.

In the mixture according to the invention, preferably at least 30 wt. %, preferably at least 45 wt. %, particularly preferably at least 60 wt. %, in particular at least 75 wt. %, above all at least 90 wt. % of the electrically conductive hard particles A can be oxides or/and phosphides substantially based on aluminium, iron, cobalt, copper, manganese, molybdenum, nickel, niobium, tantalum, titanium, vanadium, tungsten, zinc or/and tin, including oxides having a below-stoichiometric oxygen content and having an elevated electrical conductivity, in particular oxides or/and phosphides based on iron-, manganese-, nickel- or/and zinc-containing compounds or mixtures thereof.

Preferably, the content of the electrically conductive hard particles A based on boride, carbide, phosphate, silicate and silicide is not more than 60 wt. % of all the electrically conductive hard particles A, particularly preferably not more than 45 wt. %, very particularly preferably not more than 30 wt. %, in particular not more than 15 wt. %. However, it may be preferable to adjust the content of iron oxide pigment, in particular such as is known in the lacquer industry, to contents of up to 20 wt. %, particularly preferably to up to 10 wt. %, very particularly preferably to up to 5 wt. %, in particular to no such pigment content at all.

The substance of at least one or at least one of several substances from the category of the electrically conductive hard particles A preferably has, in the massive state at room temperature, an electrical resistance of not more than 100 $\Omega \cdot cm$, particularly preferably not more than 50 $\Omega \cdot cm$, very particularly preferably not more than 5 $\Omega \cdot cm$, in particular an electrical resistance no greater than that of commercially available pulverulent metallic zinc, above all an electrical resistance no greater than that of commercially available iron phosphide mixtures based on FeP and $Fe_2P$, including impurities.

The substance of at least one or at least one of several substances from the category of the electrically conductive hard particles A preferably has, embedded as fine particles distributed in a polymeric matrix based on epoxide in a weight ratio of particles A: polymer of 90:10, as a pressed article of approx. 25 mm diameter and 3 mm height at room temperature, an electrical volume resistance of not more than 200 $\Omega \cdot cm$, particularly preferably of not more than 100 $\Omega \cdot cm$, very particularly preferably of not more than 25 $\Omega \cdot cm$, in particular an electrical resistance no greater than that when commercially available pulverulent metallic zinc is used instead of particles A, above all an electrical resistance no greater than that of commercially available iron phosphide mixtures based on FeP and $Fe_2P$, including impurities, as particles A.

However, the electrically conductive hard particles A do not have to have high-performance friction properties. They preferably have a Mohs hardness, measured on large crystals or compact components, of at least 3, preferably of at least 4 or at least 4.5, particularly preferably of at least 5, in particular of at least 5.5.

All particle size determinations from an average particle size of 0.3 μm are based on distributions measured with a Mastersizer of the type S from Malvern Instruments. The suspension with the particles to be measured was prepared here in accordance with the information in the examples and comparison examples. For determinations below an average size of 0.3 μm, measurements or evaluations from photographs which have been obtained with a scanning electron microscope on particles well-distributed on a support are preferably to be used. In the case of larger accumulations recognizable as agglomerates, the particles should be counted here separately as many individual particles and not as individual agglomerates and at least 400 particles should be taken into account in order to be able to determine approximate distributions.

Preferably, the passage value $d_{99}$ of the electrically conductive hard particles A is not more than 8 μm, particularly preferably not more than 7 μm, very particularly preferably not more than 6 μm, above all not more than 5 μm. The passage value $d_{99}$ of the electrically conductive hard particles A is advantageously in the range from 0.5 to 6.5 μm, particularly preferably in the range from at least 1.5 μm and up to 5.5 μm, very particularly preferably in the range from at least 2.0 μm and up to 4.5 μm, above all in the range from at least 2.5 μm and up to 4.0 μm.

In the mixture according to the invention, the mixture of all the types of electrically conductive hard particles A can have, in particular, an average particle size $d_{50}$ of not more than 2.6

µm or not more than 2.2 µm or/and in the range from 0.1 to 2.5 µm, very particularly in the range from 0.2 to 2 µm. Preferably, it is in a range up to 1.8 µm, particularly preferably in a range up to 1.6 µm, very particularly preferably in a range up to 1.4 µm and preferably in a range from at least 0.5 µm. Platelets or straight-edged particles are the preferred particle shape of the electrically conductive particles, but substantially isometrically shaped particles may also be advantageous.

The size of the electrically conductive hard particles A, based on the passage value $d_{10}$, is advantageously not more than 1.5 µm, in particular not more than 1.2 µm, very particularly preferably not more than 0.8 µm.

In the mixture according to the invention, the mixture of all the types of electrically conductive hard particles A can preferably have a steep particle size distribution in which the passage value $d_{99}$ to the passage value $d_{10}$ is at most a factor of 12. This factor is in particular at most the factor 11, particularly preferably at most 10, very particularly preferably at most 9, above all at most 8.

In the process according to the invention, the electrically conductive hard particles A are preferably ground alone by themselves. Grinding can be carried out here separately for each particle type A or in part mixtures or in a total mixture of all the types of particles A. In the process according to the invention, the over-sized particles can predominantly be comminuted during grinding of the electrically conductive hard particles A, so that a narrower particle size distribution arises. A steep particle size distribution of the hard powders A which make up a high content of the pigmentation contributes substantially to a uniform particle distribution within the finished coating. It is particularly advantageous if a narrower particle size distribution is established by the grinding of the electrically conductive hard particles A, especially if the very fine particles are scarcely comminuted or if the powder is not ground to dust by this means. It is particularly preferable to adjust the particle size distribution to a narrower distribution by grinding only for the particle types of the electrically conductive hard particles A of which the average particle size is greater than 1 µm, very particularly preferably greater than 2 µm. If a mixture of various electrically conductive hard particles A should be present, it may be of interest to grind either only the mixture or/and the individual particle grades separately. Grinding of these particles or this particle mixture A is preferably particularly intensive, in particular using specific grinding units. It may be of interest here to choose a grinding unit which is not normally employed in the lacquer industry because in the lacquer industry usually only relatively low-intensity grinding is carried out, that is to say conventionally only a mixture of soft or/and hard substances or a mixture of polymeric or/and inorganic substances, which are not necessarily in particle form, is ground and the grinding conditions for hard particles for this reason alone are of relatively low intensity.

If more than in each case one powder grade per pigment category should be present, in particular in the case of pigment A, in the case of a hard pigment C or/and in the case of a pigment D, the individual powder grade preferably has an average particle size which is approximately of the order of size of the average particle size $d_{50}$ of the pigment A or of all types of the pigment A ($d_{50} \pm 1$ µm) or slightly lower (down to $d_{50}-1$ µm). The corrosion protection pigment D of at least one optionally present preferably has an average particle size which is also approximately of the size of the average particle size $d_{50}$ of the pigment A ($d_{50} \pm 1$ µm) or slightly below (down to $d_{50}-1$ µm). These properties can also contribute substantially to establishing a uniform particle distribution within the finished coating.

In the mixture according to the invention, preferably, the content of electrically conductive hard particles A in the mixture can be 10 to 80 wt. % or/and the content in the mixture of very soft or soft particles B which are capable of sliding can be 0.1 to 16 wt. %, in each case based on the weight of the solid in the wet lacquer (all solids=100 wt. %). Preferably, the content of electrically conductive hard particles A here is at least 12 wt. % and not more than 70 wt. %, based on the weight of the solid in the wet lacquer, particularly preferably at least 15 wt. % and not more than 65 wt. %, very particularly preferably at least 20 wt. % and not more than 60 wt. %. At a high content of electrically conductive hard particles A in the mixture, a harder, stronger, more electrically conductive and usually also more chemically stable coating is achieved, while with a low content of electrically conductive hard particles A in the mixture a softer, less strong, under certain circumstances less electrically conductive coating is rather achieved.

Preferably, the content of very-soft or soft particles B which are capable of sliding in this context is at least 0.2 wt. % and not more than 12 wt. %, based on the weight of the solid in the wet lacquer, particularly preferably at least 0.3 wt. % and not more than 8 wt. %, very particularly preferably at least 0.5 wt. % and not more than 6 wt. %. Preferably, the content of sulfides, selenides and tellurides in the mixture is not more than 5 wt. % and particularly preferably not more than 3.5 wt. %, very particularly preferably not more than 2.5 wt. %, based on the weight of the solid in the wet lacquer. If these substances should be less corrosion-resistant, their content should not be too high. At a high content in the mixture of very soft or soft particles B which are capable of sliding, a flexible, softer coating which is very readily capable of sliding is formed, while with a particularly low content in the mixture of very soft or soft particles B which are capable of sliding a harder, stronger coating which usually has a better electrical conductivity is established.

The inorganic particles B which are capable of sliding are preferably those having very good friction properties. They are water-insoluble or sparingly water-soluble. They preferably contain particles having a substantially flat (platelet) or longitudinal extent (needles, straight-edged particles) or/and substantially corresponding aggregates. In particular, those based on graphite or/and chalcogenide, such as sulfide, selenide or telluride, in particular on graphite, antimony-containing, manganese-containing, molybdenum-containing, bismuth-containing, tungsten-containing or/and tin-containing chalcogenide, above all on manganese sulfide, molybdenum disulfide, tungsten disulfide or/and tin sulfide are preferred. They can also be coated e.g. with carbon or graphite. In the mixture according to the invention, they can be predominantly or entirely of graphite, sulfide, selenide or/and telluride, in particular of graphite, antimony-containing sulfide, tin-containing sulfide, molybdenum sulfide or/and tungsten sulfide.

In the mixture according to the invention, the mixture of all the types of very soft or soft particles B which are capable of sliding can have, on addition to the mixture, a particle size passage value $d_{99}$ in a range from 1 to 30 µm, in particular in a range from at least 4 µm and up to 25 µm, preferably in a range up to 22 µm, particularly preferably in a range up to 20 µm, preferably in a range from at least 12 µm, particularly preferably in a range from at least 14 µm. Preferably, the passage value $d_{99}$ of the particles B is significantly higher than the passage value $d_{99}$ of the particles A, in particular higher by a factor of 1.2 to 10, preferably by a factor of 1.5 to 8, particularly preferably by a factor of 2 to 7. The particles B often show out of the coating to a certain amount if they have not been subjected to relatively severe mechanical stresses up until application of the coating, and can be comminuted rapidly during mechanical stress on the coating, such as e.g. during rubbing or shaping, these particles helping as lubricants by themselves alone or in combination with any contents of oil present, such as e.g. deep-drawing oil.

In the mixture according to the invention, the mixture of all the types of very soft or soft particles B which are capable of sliding can have, on addition to the mixture, an average particle size $d_{50}$ in the range from 0.1 to 20 μm, preferably in a range up to 18 μm, particularly preferably in a range up to 15 μm, very particularly preferably in a range up to 12 μm and preferably in a range from at least 1 μm, particularly preferably in a range from at least 3 μm, very particularly preferably in a range from at least 5 μm. Platelets are the preferred particle shape of the very soft or soft particles B which are capable of sliding. In the mixture according to the invention, the average particle size $d_{50}$ of the very soft or soft particles B which are capable of sliding can be, on addition to the mixture, greater by a factor of 1.5 to 7 than the average particle size $d_{50}$ of the electrically conductive hard particles A, preferably greater by a factor of 2 to 6, particularly preferably greater by a factor of 3 to 5.

The crystalline graphite is counted in this context among the particles B, and the other types of carbon, such as, in particular, the most diverse carbon blacks, are counted among the particles C because of the usually somewhat different properties of carbon blacks with respect to graphite.

The metallic particles C are preferably chosen from aluminium, iron, cobalt, copper, manganese, molybdenum, nickel, niobium, tantalum, titanium, tungsten, zinc, tin, zirconium or/and at least one intermetallic compound or alloy containing at least one such metal, such as e.g. ferro-alloys, such as, inter alia, FeCr, FeMn, FeSi and FeTi, steel, bronze and brass. They are water-insoluble or particularly sparingly water-soluble. They advantageously have a low hardness and high ductility.

Advantageously, no or no relatively large amounts ($\leqq 5$ wt. %) of electrically conductive particles of metals or/and alloys or/and optionally also of carbon black C are present. Preferably, the content in the mixture of very soft or soft particles B which are capable of sliding is the same as or greater than the content of metals or alloys or/and carbon black C.

In the mixture according to the invention, the mixture of all the types of metallic particles or/and carbon black C can have, on addition to the mixture, a particle size passage value $d_{99}$ in the range from 0.05 to 20 μm, in particular in the range from 0.1 to 15 μm, preferably in a range up to 12 μm, particularly preferably in a range up to 10 μm and preferably in a range from at least 0.5 μm, particularly preferably in a range from at least 0.8 μm.

In the mixture according to the invention, the mixture of all the types of metallic particles or/and carbon black C can have, on addition to the mixture, an average particle size $d_{50}$ in the range from 0.01 to 10 μm, preferably in a range up to 8 μm, particularly preferably in a range up to 5 μm, very particularly preferably in a range up to 4 μm and preferably in a range from at least 0.1 μm, particularly preferably in a range from at least 0.3 μm, very particularly preferably in a range from at least 0.5 μm. Platelets are likewise the preferred particle shape of the metallic particles or/and carbon black C. Nanoparticles can also be employed here.

In the mixture according to the invention, the average particle size $d_{50}$ of the metallic particles or/and carbon black C can be, on addition to the mixture, greater than the average particle size $d_{50}$ of the electrically conductive hard particles A by a factor of 0.1 to 4, preferably greater by a factor of 2 to 6, particularly preferably greater by a factor of 3 to 5.

In the mixture according to the invention, the consent of metallic particles or/and carbon black C in the mixture can be 0 to 75 wt. %, based on the weight of the solid in the wet lacquer. Preferably, this content is at least 0.1 wt. % and not more than 70 wt. %, based on the weight of the solid in the wet lacquer, particularly preferably at least 1 wt. % and not more than 65 wt. %, very particularly preferably at least 2 wt. % and not more than 60 wt. %. At a high content of metallic particles or carbon black C in the mixture, usually a softer, often less electrically conductive and usually also less chemically stable coating is formed, while with a particularly low content of metallic particles or carbon black C in the mixture a harder, stronger, usually more electrically conductive and frequently more chemically stable coating is often achieved.

In contrast, the corrosion protection pigments D can have a limited water-solubility or/and water-soluble contents. It is moreover preferable, especially in the presence of phosphide, for at least one inorganic or/and organic corrosion inhibitor also to be employed, but at least one corrosion protection pigment D may also be sufficient for this purpose. A corrosion protection pigment D based on phosphates, such as e.g. aluminium, alkaline earth metal or zinc phosphate, or/and based on alkaline earth metal carbonate, alkaline earth metal silicate or/and alkaline earth metal phosphosilicate is particularly preferred. A corrosion inhibitor based on amides, amines, butanoic acid derivatives, imides or/and imines is particularly preferred. The corrosion protection pigments D and the corrosion inhibitors are known in principle.

In the mixture according to the invention, the mixture of all the types of corrosion protection particles D can have, on addition to the mixture, a particle size passage value $d_{99}$ in the range from 0.03 to 10 μm, preferably in a range up to 8 μm, particularly preferably in a range up to 6 μm, very particularly preferably in a range up to 5 μm and preferably in a range from at least 0.1 μm, particularly preferably in a range from at least 0.3 μm, very particularly preferably in a range from at least 0.5 μm. Furthermore, it is advantageous if the particle size passage value $d_{99}$ of the corrosion protection particles D is no greater than or not substantially greater than the particle size passage value $d_{99}$ of the electrically conductive hard particles A.

In the mixture according to the invention, the mixture of all the types of corrosion protection particles D can have, on addition to the mixture, an average particle size $d_{50}$ in the range from 0.01 to 5 μm, preferably in a range up to 4 μm, particularly preferably in a range up to 3 μm, very particularly preferably in a range up to 2 μm and preferably in a range from at least 0.05 μm, particularly preferably in a range from at least 0.1 μm, very particularly preferably in a range from at least 0.3 μm. Furthermore, it is advantageous if the average particle size of all the types of corrosion protection particles D is the same as or not substantially smaller than the average particle size of the electrically conductive hard particles A. It is preferable to distribute the corrosion protection particles D finely and homogeneously in the mixture and the coating formed therefrom. The corrosion protection particles D can build up a barrier action for e.g. hydrogen ions and are consumed during corrosion no differently than sacrificing corrosion agents, such as e.g. metallic manganese or zinc. Platelets are the preferred particle shape of the corrosion protection pigment particles D.

In particular, the content of powders $\Sigma(B+C)$ relative to the total content of the water-insoluble or sparingly water-soluble pigmentation Σ(A+B+C) is 0.4 up Lo 65%, preferably at least 1% and up to 60%, particularly preferably at least 2% and up to 55%.

The content here of particles B relative to the total content of the water-insoluble or sparingly water-soluble pigmentation Σ(A+B+C) is, in particular, 0.25 to 20%, preferably at least 0.4% and up to 12%, particularly preferably at least 0.8% and up to 8%. The content here of powder C relative to the total content of the water-insoluble or sparingly water-soluble pigmentation Σ(A+B+C) is, in particular, 0.25 to 45%, preferably at least 0.4% and up to 40%, particularly preferably at least 0.8% and up to 36%.

It is advantageous here if the sum of the weight contents of the water-insoluble or sparingly water-soluble pigmentation Σ(A+B+C) relative to the sum of the total pigmentation Σ(A+B+C+D) in the mixture is 30 to 99 wt. %. Preferably, it is 50 to 98 wt. %, particularly preferably at least 70 wt. % and up to 97 wt. %, very particularly preferably at least 90 wt. % and up to 96 wt. %.

A mixture in which the content of electrically conductive hard particles A is 48 to 68 wt. %, the content of very soft or soft particles B which are capable of sliding is 0.1 to 6 wt. %, the content of metallic, soft or hard, electrically conductive or semiconducting particles or/and carbon black C is 0 to 16 wt. % and the content of corrosion protection pigment D is 1 to 12 wt. %, in each case based on the weight of the solid in the wet lacquer, is very particularly preferred. A mixture in which the content of electrically conductive hard particles A is 52 to 62 wt. %, the content of very soft or soft particles B which are capable of sliding is 0.5 to 4 wt. %, the content of metallic, soft or hard, electrically conductive or semiconducting particles or/and carbon black C is 0 to 12 wt. % and the content of corrosion protection pigment D is 2 to 8 wt. %, in each case based on the weight of the solid in the wet lacquer, is particularly preferred. Under certain circumstances, the content of particles C is at least 0.1 wt. %.

Preferably, the total content of the pigmentation Σ(A+B+C+D) relative to the total content of solid in the wet lacquer is 30 to 90 wt. %, particularly preferably 45 to 85 wt. %, very particularly preferably 60 to 80 wt. %. It is to be ensured here that at total contents of the pigmentation Σ(A+B+C+D) of more than 80 wt. % a sufficient elasticity of the polymeric matrix is established if relatively severe shaping is envisaged.

The solids contents of the liquid mixture remain practically identical from the wet lacquer via the dry film to the finished crosslinked coating produced therefrom. The solids contents of the mixture can therefore be regarded as the same as in the finished coating. If carbonate or similar substances with optionally volatile contents are to be used, this is to be taken into account accordingly.

In the mixture according to the invention, it may be advantageous if a content of organic lubricant, such as e.g. polyethylene wax, is added. Preferably, the mixture according to the invention will comprise not more than 0.5 wt. % of wax or/and of substances having wax-like properties, in particular not more than 0.2 wt. %, based on the dry weight of the wet lacquer, particularly preferably no wax and no substances having wax-like properties. At contents between 0.1 and 0.5 wt. %, these substances often already lead to an impairment of the adhesion or cohesion with subsequently applied coatings, such as e.g. further lacquer layers or adhesives, such as e.g. epoxy resin adhesives or adhesives of adhesive films. If gluing is not to be carried out, in particular, the content of organic lubricant can also be increased.

The object is moreover achieved by a process for producing a corrosion-resistant, viscoelastic coating comprising polymers and inorganic particles on a substrate, which is characterized in that a mixture according to the invention is applied to an optionally precoated substrate, optionally dried and at least partly crosslinked.

Preferably, all the components of the mixture after drying, in the partly or/and completely cured state, are resistant to water and weak alkaline media.

The mixture according to the invention can be applied, in particular, by knife-coating, rolling, atomizing or/and spraying. Such an application is preferably carried out on a strip, which can be precoated. Spraying is particularly preferred for application to components. The application should be as uniform as possible and of as far as possible the same thickness.

The mixture can preferably be dried in the temperature range from 20 to 320° C., it also being possible to use drying in air at room temperatures or only slightly elevated temperatures. If crosslinking at relatively low temperatures ensures a binder mixture for a sufficiently chemically stable coating, stoving at usually a high temperature is not absolutely necessary. Stoving of a thermally crosslinking polymer system can preferably be carried out in the temperature range from 100 to 320° C. Thermal crosslinking can also be combined with crosslinking initiated by free radicals, which in particular helps to generate particularly high degrees of crosslinking. In particular, thermal post-crosslinking after the crosslinking initiated by free radicals is advantageous here. The types of crosslinking, their combination and the polymer systems on which they are based are adequately known to the expert.

In the process according to the invention, the very soft or soft particles B which are capable of sliding, such as e.g. graphite, can in each case not be ground or subjected to only low-intensity grinding before the addition to the mixture or in the mixture or/and in a portion of the mixture, since it is advantageous if the particles of the graphite or/and the aggregates of many coherent or caked-together individual particles are more or less, largely or completely retained in their size, which is preferably significantly greater than that of the electrically conductive hard particles A, and as far as possible only slightly lose in size for the intermixing. It is advantageous if these particles are also distributed as homogeneously as possible, in particular in the organic binder system. The mixture according to the invention can be applied to strips, metal sheets, parts and composite components of at least two parts, which are joined e.g. by clinching, gluing or/and welding. The mixture according to the invention can be applied, in particular, on fast-running belt installations, such as e.g. galvanizing installations or/and coil coating installations, on single rolled sheet installations and in parts production, in assembling or in the repair field.

In the process according to the invention, the particle size passage value $d_{99}$ of the electrically conductive hard particles A can be not substantially greater than, no greater than or only slightly smaller than the average thickness of the coating. The particle size passage value $d_{99}$ of the electrically conductive hard particles A is advantageously in the range of ±3 µm, in particular in the range of ±2 µm, in the range of ±1 µm around the average thickness of the welding primer coating according to the invention, measured microscopically on a ground cross-section. It is particularly preferable for this particle size passage value $d_{99}$ to be somewhat smaller ($d_{99}$ up to 2.5, 1.5 or 0.8 µm smaller) than the average thickness of the welding primer coating according to the invention.

It is preferable, at an average thickness of the welding primer coating according to the invention of e.g. 8 µm, for the particle size passage value $d_{99}$ of the electrically conductive hard particles A to be in the range from 10 to 5 µm and, at e.g. a thickness of 6 µm, for the particle size passage value $d_{99}$ of the electrically conductive hard particles A to be in the range from 8 to 3 μm ($d_{99}$+2 and −3 μm or $d_{99}$+1 and −2 μm). The particle size passage value $d_{99}$ of the electrically conductive hard particles A is preferably slightly less than the average thickness of the dry cured coating.

On measurement of the volume resistance, using a laboratory apparatus corresponding to DVS leaflet 2929, of a metal sheet provided on one side at least with a welding primer layer and optionally also coated beforehand with e.g. zinc or/and a pretreatment, the coating according to the invention preferably has an electrical resistance of not more than 100 mΩ, particularly preferably of not more than 65 mΩ, very particularly preferably of not more than 30 mΩ. These data preferably also apply to metal sheets coated on both sides.

It is moreover preferable for the coating according to the invention on a steel sheet to be corrosion-resistant such that it withstands at least 10, preferably at least 16, particularly preferably at least 20, very particularly preferably at least 22 cycles of a corrosion protection alternating test in accordance with VDA 621-415 without the occurrence of red rust.

In the process according to the invention, the mixture applied to the substrate can be dried, stoved, irradiated with free radicals or/and heated in order to form a thoroughly crosslinked, corrosion-resistant, viscoelastic coating. In the case of a content of post-crosslinking compounds, an even greater degree of post-crosslinking can also be achieved by this means due to thermal stimulation, especially if crosslinking with free-radical radiation, in particular UV radiation, has been initiated beforehand. The pigmentation is preferably present in the polymeric matrix with a good distribution. Furthermore, it is preferable for the degree of crosslinking of the polymeric matrix to be at least 70%, preferably at least 80%, particularly preferably at least 90%. In thermally curing polymer systems, the degree of crosslinking can in some cases also be adjusted via the stoving temperature and duration or/and via the content of catalysts.

In the process according to the invention, a coating having a thickness of less than 10 μm, in particular of less than 8 μm, preferably of less than 6 μm and particularly preferably of less than 4 μm, measured in the dry state microscopically on a ground cross-section, can be produced.

In the process according to the invention, the mixture can be free or substantially free from organic lubricants, such as e.g. based on PTFE, silicone or/and oil, and free from inorganic or/and organic acids or/and heavy metals and other cations, such as e.g. arsenic, lead, cadmium, chromium, cobalt, copper or/and nickel. Preferably, all or most of these substances are not intentionally added. Under certain circumstances, acids could increase the water uptake of the coating. Organic corrosion inhibitors should not be added in an overdose.

In the process according to the invention, the substrate can comprise at least one metal or/and at least one alloy and can optionally be precoated and in particular comprise a sheet of aluminium, of an aluminium, iron or magnesium alloy or of steel, such as e.g. automobile steels.

In the process according to the invention, the mixture according to the invention can be applied directly to a pretreatment coating. The pretreatment coating of at least one in this context can be, in particular, one based on or having a content of in each case at least one silicon, titanium or/and zirconium compound, based on a complex fluoride compound, such as e.g. based on $TiF_6$, based on a phosphating coating, based on an alkaline passivation, such as having a content of at least one metal oxide, such as e.g. a passivation based on aluminium, iron, cobalt, manganese, nickel or/and zinc oxide, or/and based on a pretreatment coating comprising polymer, very fine particles and optionally at least one compound of at least one IIIB/IVB element, such as e.g. La, Y, lanthanides, such as Ce etc., Ti, Zr, Hf or/and phosphate.

The object is furthermore achieved with an electrically conductive coating comprising polymers and inorganic particles which is produced with a mixture according to the invention or/and produced by the process according to the invention.

The coating according to the invention can be used as a welding primer, as a protective coating during shaping or/and joining, as corrosion protection of surfaces or in the edge, seam or/and welded seam region, as protection instead of a hollow cavity seal or/and a seam seal, in particular for vehicle construction or aircraft construction.

EXAMPLES AND COMPARISON EXAMPLES

The following examples (E) and comparison examples (CE) which are reproduced in the tables explain preferred embodiments of the mixture, process and coating according to the invention.

The experiments for the examples according to the invention and for the comparison examples were largely carried out with the conventional raw materials, units and process steps in the lacquer industry, apart from individual pigments and individual grinding processes.

In the preparation of the mixtures, all the binders were initially introduced into the mixing vessel and diluted with the organic solvent or/and water, the additives and the corrosion protection pigments D were then added and the mixture which existed was ground. Thereafter, the particles A, B and D, optionally already ground separately, were added and dispersed thoroughly with a dissolver. In the examples according to the invention, the phosphides were subjected to separate intense grinding before addition to the mixture, so that the passage value $d_{99}$ of the particle size distribution was 4 μm for iron phosphide and 3.5 μm for manganese phosphide. The particles of $Fe_3O_4$ had a passage value $d_{99}$ of the particle size distribution of about 8.5 μm. Finally, the viscosity was adjusted with water or/and organic solvent to a flow time in the flow cup in the range from 30 to 60 s in accordance with ISO/2431 (5 mm). This mixture was applied by means of a laboratory coater or applicator knife to hot-dip galvanized or electrolytically galvanized and subsequently pretreated metal sheets of less than 1 mm thick. The metal sheets coated in this manner were dried at 80° C. and, in the case of thermally crosslinking systems, stoved at temperatures differing from specimen to specimen in the range from 160 up to 300° C. In the case of radiation-curing systems, curing was initiated with UV radiation. The post-crosslinking compound was optionally added directly before the coating and stimulated to further crosslinking by heating to temperatures of approx. 100° C.

The compositions in tables 1 and 4 are calculated to 100 parts by weight from the solids contents of the various additives, including the added water and organic solvent (wet lacquer). The tables show the diversity of compositions with different binder systems and different pigment types and contents. Table 2 shows the properties of the coatings produced with the mixtures of table 1. In table 3, the particle size distributions of the particles A, B or/and C vary, based on individual compositions according to the invention of table 1, and the table shows here the properties of the coatings produced with these mixtures.

The particle size distributions were measured with a Mastersizer of type S from Malvern Instruments, a suspension being established by addition of a random sample of the particles to be measured and of one to two small drops of surfactant mixture (Pril®) to deionized water, this suspension additionally being dispersed by the action of ultrasound with the source of ultrasound incorporated in the apparatus, initially at an intensity of approx. 80% for approx. 5 s and then at an intensity of approx. 30% for approx. 25 s. To establish the suspension and for the measurement, a pump setting of approx. 50% and a stirrer setting of approx. 40% were chosen, and the measurement was carried out in the "obscuration" setting (approx. 20%)

On specimens according to the invention and on a comparison specimen, roughness measurements were carried out with a Perthometer from Mahr of the type S8P and with an RFHTB/250 probe with a measurement zone of 4 mm, a feed rate of 0.5 mm/s and a cut-off of 0.8 mm on in each case five measurement zones of 4 mm measurement length in accordance with DIN 4768 and DIN 4771, in order to determine and take the average of the roughness values. The roughness values of table 4 were determined: mean roughness value $R_a$, average peak-to-valley height $R_{3z}$ and maximum individual peak-to-valley height $R_{max}$.

The electrical volume resistance (individual sheet measurement) was moreover also determined, by means of a laboratory apparatus in accordance with DVS leaflet 2929 (Deutscher Verband für Schweißtechnik e.V., August 1985), on specimens coated on one side. In this determination, two electrodes of oxygen-free copper of 20 mm diameter and cylindrical radius r=300 mm were guided at room temperature from the top and bottom perpendicularly to the metal sheet coated on one side or in the exception on both sides and pressed on with a closing pressure of 7.5 kN and the measurement was carried out for 2 s with a direct voltage at a current strength of 10 A. The measurement of the volume resistance was carried out at not less than 10 points, means being obtained from the measurement values.

The experiments show that optimization of the coating according to the invention between shapability, low abrasion during shaping, chemical stability, corrosion resistance and weldability during resistance welding is in no way easy. While the additions of particles B and e.g. zinc help to improve the shapability, a content of metallic particles C can precisely significantly reduce the corrosion resistance. The particular electrical conductivity and the contents of particles A, B and C substantially co-determine the weldability.

TABLE 1

Composition of the examples according to the invention and the comparison examples, calculated for solids contents

| | Examples, comparison examples | | | | | | | | | | | |
|---|---|---|---|---|---|---|---|---|---|---|---|---|
| | E 1 | E 2 | E 3 | E 4 | E 5 | E 6 | E 7 | E 8 | CE 9 | CE 10 | CE 11 | CE 12 |
| Thermal binders | | | | | | | | | | | | |
| 1.a. Aqueous emulsion of an epoxy resin "type 7" (bisphenol A) | 5.00 | 5.00 | 5.00 | 5.00 | 5.00 | 5.00 | 5.00 | 5.00 | 5.00 | 5.00 | 5.00 | 5.00 |
| 1.b. Aqueous emulsion of a flexibilized epoxy resin "type 1" | 4.00 | 4.00 | 4.00 | 4.00 | 4.00 | 4.00 | 4.00 | 4.00 | 4.00 | 4.00 | 4.00 | 4.00 |
| 1.c. Aqueous emulsion of an HDI isocyanate, masked | 6.00 | 6.00 | 6.00 | 6.00 | 6.00 | 6.00 | 6.00 | 6.00 | 6.00 | 6.00 | 6.00 | 6.00 |
| Additives | | | | | | | | | | | | |
| 2.a. Polysiloxane | 0.20 | 0.20 | 0.20 | 0.20 | 0.20 | 0.20 | 0.20 | 0.20 | 0.20 | 0.20 | 0.20 | 0.20 |
| 2.b. 2-Amino-2-methyl-1-propanol | 0.25 | 0.25 | 0.25 | 0.25 | 0.25 | 0.25 | 0.25 | 0.25 | 0.25 | 0.25 | 0.25 | 0.25 |
| Electrically conductive pigments and pigments which are capable of sliding | | | | | | | | | | | | |
| 3.a. Iron phosphide | 57.50 | 51.00 | 50.00 | 54.00 | 55.00 | 52.50 | — | — | — | — | 60.00 | — |
| 3.b. Manganese phosphide; * = $Fe_3O_4$ | — | *4.00 | — | — | — | — | 56.50 | 54.00 | — | — | — | 60.00 |
| 3.c. Aluminium | — | — | — | — | — | — | — | — | 56.50 | 55.00 | — | — |
| 3.d. Graphite | 1.00 | 2.50 | 5.00 | 1.00 | — | — | 1.00 | 1.00 | 1.00 | 1.00 | — | — |
| 3.e. Molybdenum disulfide | — | — | — | 2.50 | 2.50 | 5.00 | — | 2.50 | — | 2.50 | — | — |
| Corrosion protection pigments | | | | | | | | | | | | |
| 4.a. Silicate pigment modified with calcium ions | 5.00 | 5.00 | 5.00 | 5.00 | 5.00 | 5.00 | 5.00 | 5.00 | 5.00 | 5.00 | — | — |
| Solvent | | | | | | | | | | | | |
| 5.a. Completely demineralized water | 5.00 | 5.00 | 5.00 | 5.00 | 5.00 | 5.00 | 5.00 | 5.00 | 5.00 | 5.00 | 5.00 | 5.00 |
| 5.b. Total content of org. solvent | 16.05 | 17.05 | 19.55 | 17.05 | 17.05 | 17.05 | 17.05 | 17.05 | 17.05 | 16.05 | 19.55 | 19.55 |

| | Examples, comparison examples | | | | | | | | | | | |
|---|---|---|---|---|---|---|---|---|---|---|---|---|
| | E 13 | E 14 | E 15 | E 16 | E 17 | E 18 | CE 19 | E 20 | CE 21 | CE 22 | CE 23 | CE 24 |
| Thermal binders | | | | | | | | | | | | |
| 1.a. Semi-solid ester-epoxy resin | 7.00 | 7.00 | 7.00 | 7.00 | 7.00 | 7.00 | 7.00 | 7.00 | 7.00 | 7.00 | 7.00 | 7.00 |
| 1.b. Polyester, soft resin | 3.00 | 3.00 | 3.00 | 3.00 | 3.00 | 3.00 | 3.00 | 3.00 | 3.00 | 3.00 | 3.00 | 3.00 |
| 1.c. Emulsified HDI, masked | 5.25 | 5.25 | 5.25 | 5.25 | 5.25 | 5.25 | 5.25 | 5.25 | 5.25 | 5.25 | 5.25 | 5.25 |

TABLE 1-continued

Composition of the examples according to the invention and the comparison examples, calculated for solids contents

Additives

|  |  |  |  |  |  |  |  |  |  |  |  |  |
|---|---|---|---|---|---|---|---|---|---|---|---|---|
| 2.a. Polysiloxane | 0.05 | 0.05 | 0.05 | 0.05 | 0.05 | 0.05 | 0.05 | 0.05 | 0.05 | 0.05 | 0.05 | 0.05 |
| 2.b. Dibutyltin dilaurate (DBTL) | 1.00 | 1.00 | 1.00 | 1.00 | 1.00 | 1.00 | 1.00 | 1.00 | 1.00 | 1.00 | 1.00 | 1.00 |

Electrically conductive pigments and pigments which are capable of sliding

|  |  |  |  |  |  |  |  |  |  |  |  |  |
|---|---|---|---|---|---|---|---|---|---|---|---|---|
| 3.a. Iron phosphide | 56.50 | 47.00 | 50.00 | 54.00 | 55.00 | 52.50 | — | — | — | — | 70.00 | — |
| 3.b. Manganese phosphide; * = Fe₃O₄ | — | *8.00 | — | — | — | — | 57.50 | 54.00 | 56.50 | 55.00 | — | 70.00 |
| 3.c. Aluminium | — | — | — | — | — | — | — | — | — | — | 0.50 | 0.50 |
| 3.d. Graphite | 1.00 | 2.50 | 5.00 | 1.00 | — | — | — | 1.00 | 1.00 | — | — | — |
| 3.e. Molybdenum disulfide | — | — | — | 2.50 | 2.50 | 5.00 | — | — | 2.50 | 5.00 | — | — |

Corrosion protection pigments

|  |  |  |  |  |  |  |  |  |  |  |  |  |
|---|---|---|---|---|---|---|---|---|---|---|---|---|
| 4.a. Silicate pigment modified with calcium ions | 5.00 | 5.00 | 5.00 | 5.00 | 5.00 | 5.00 | 5.00 | 5.00 | 5.00 | 5.00 | — | — |

Solvent

|  |  |  |  |  |  |  |  |  |  |  |  |  |
|---|---|---|---|---|---|---|---|---|---|---|---|---|
| 5.a. Completely demineralized water | — | — | — | — | — | — | — | — | — | — | — | — |
| 5.b. Total content of org. solvent | 21.20 | 21.20 | 23.70 | 21.20 | 21.20 | 21.20 | 21.20 | 23.70 | 18.70 | 18.70 | 13.20 | 13.20 |

Examples, comparison examples

| | CE 25 | E 26 | E 27 | E 28 | E 29 | E 30 | E 31 | CE 32 | E 33 | E 34 | E 35 | E 36 |
|---|---|---|---|---|---|---|---|---|---|---|---|---|

UV binders, optionally with post-crosslinking

|  |  |  |  |  |  |  |  |  |  |  |  |  |
|---|---|---|---|---|---|---|---|---|---|---|---|---|
| 1.a. Polyurethane dispersion, curing by free radicals | 15.00 | 12.50 | 12.50 | 12.50 | 12.50 | 12.50 | 12.50 | 12.50 | 12.50 | 12.50 | 12.50 | 12.50 |
| 1.b. Polyfunctional isocyanurate based on HDI | — | 2.50 | 2.50 | 2.50 | 2.50 | 2.50 | 2.50 | 2.50 | 2.50 | 2.50 | 2.50 | 2.50 |

Additives

|  |  |  |  |  |  |  |  |  |  |  |  |  |
|---|---|---|---|---|---|---|---|---|---|---|---|---|
| 2.a. Polysiloxane | 0.25 | 0.25 | 0.25 | 0.25 | 0.25 | 0.25 | 0.25 | 0.25 | 0.25 | 0.25 | 0.25 | 0.25 |
| 2.b. 1-Hydroxy-cyclohexyl phenyl ketone | 1.50 | 1.50 | 1.50 | 1.50 | 1.50 | 1.50 | 1.50 | 1.50 | 1.50 | 1.50 | 1.50 | 1.50 |
| 2.c. Bis(2,6-dimethoxybenzyl)-2,4,4-trimethylpentylphosphine oxide | 0.75 | 0.75 | 0.75 | 0.75 | 0.75 | 0.75 | 0.75 | 0.75 | 0.75 | 0.75 | 0.75 | 0.75 |

Electrically conductive pigments and pigments which are capable of sliding

|  |  |  |  |  |  |  |  |  |  |  |  |  |
|---|---|---|---|---|---|---|---|---|---|---|---|---|
| 3.a. Iron phosphide | 55.00 | 55.00 | 52.50 | 50.00 | 50.00 | 52.50 | 50.00 | — | — | 55.00 | 65.00 | — |
| 3.b. Manganese phosphide | — | — | — | — | — | — | — | 55.00 | 54.00 | — | — | 65.00 |
| 3.c. Aluminium | — | — | — | — | — | — | — | — | — | — | 0.50 | 0.50 |
| 3.d. Graphite | — | 1.00 | 2.50 | 5.00 | 1.00 | — | — | — | 1.00 | 2.50 | — | — |
| 3.e. Molybdenum disulfide | — | — | — | — | 2.50 | 2.50 | 5.00 | — | — | — | — | — |

Corrosion protection pigments

|  |  |  |  |  |  |  |  |  |  |  |  |  |
|---|---|---|---|---|---|---|---|---|---|---|---|---|
| 4.a. silicate pigment modified with calcium ions | 2.50 | 2.50 | 2.50 | 2.50 | 2.50 | 2.50 | 2.50 | 2.50 | 2.50 | 2.50 | — | — |

Solvent

|  |  |  |  |  |  |  |  |  |  |  |  |  |
|---|---|---|---|---|---|---|---|---|---|---|---|---|
| 5.a. Total content of org. solvent | 2.50 | 2.50 | 2.50 | 2.50 | 2.50 | 2.50 | 2.50 | 2.50 | 2.50 | 2.50 | 2.50 | 2.50 |
| 5.b. Completely demineralized water | 22.50 | 21.50 | 22.50 | 22.50 | 24.00 | 22.50 | 22.50 | 22.50 | 22.50 | 20.00 | 14.50 | 14.50 |

Examples, comparison examples

| | E 37 | E 38 | E 39 | E 40 | E 41 | E 42 | CE 43 | CE 44 | CE 45 | CE 46 | E 47 | CE 48 |
|---|---|---|---|---|---|---|---|---|---|---|---|---|

Thermal binders

|  |  |  |  |  |  |  |  |  |  |  |  |  |
|---|---|---|---|---|---|---|---|---|---|---|---|---|
| 1.a. Semi-solid ester-epoxy resin | 7.00 | 7.00 | 7.00 | 7.00 | 7.00 | 7.00 | 7.00 | 7.00 | 7.00 | 7.00 | 7.00 | 7.00 |
| 1.b. Polyester, soft resin | 3.00 | 3.00 | 3.00 | 3.00 | 3.00 | 3.00 | 3.00 | 3.00 | 3.00 | 3.00 | 3.00 | 3.00 |
| 1.c. Emulsified HDI, masked | 5.25 | 5.25 | 5.25 | 5.25 | 5.25 | 5.25 | 5.25 | 5.25 | 5.25 | 5.25 | 5.25 | 5.25 |

Additives

|  |  |  |  |  |  |  |  |  |  |  |  |  |
|---|---|---|---|---|---|---|---|---|---|---|---|---|
| 2.a. Polysiloxane | 0.05 | 0.05 | 0.05 | 0.05 | 0.05 | 0.05 | 0.05 | 0.05 | 0.05 | 0.05 | 0.05 | 0.05 |
| 2.b. Dibutyltin dilaurate (DBTL) | 1.00 | 1.00 | 1.00 | 1.00 | 1.00 | 1.00 | 1.00 | 1.00 | 1.00 | 1.00 | 1.00 | 1.00 |

Electrically conductive pigments and pigments which are capable of sliding, with zinc contents

|  |  |  |  |  |  |  |  |  |  |  |  |  |
|---|---|---|---|---|---|---|---|---|---|---|---|---|
| 3.a. Iron phosphide | 28.00 | 34.50 | 45.50 | 45.00 | 45.00 | 45.00 | — | — | — | — | 35.00 | 70.00 |

TABLE 1-continued

Composition of the examples according to the invention and the comparison examples, calculated for solids contents

| | | | | | | | | | | | | |
|---|---|---|---|---|---|---|---|---|---|---|---|---|
| 3.f. Zinc | 28.00 | 22.50 | 11.50 | 11.00 | 10.00 | 10.00 | 65.00 | 65.00 | 65.00 | 65.00 | 35.00 | — |
| 3.d. Graphite | — | — | — | 1.00 | 2.00 | 1.00 | 1.00 | — | 1.00 | 1.00 | — | — |
| 3.e. Molybdenum disulfide | — | — | — | — | — | 1.00 | — | 1.00 | 1.00 | 1.00 | 1.00 | — |
| Corrosion protection pigments | | | | | | | | | | | | |
| 4.a. Silicate pigment modified with calcium ions | 2.50 | 2.50 | 2.50 | 2.50 | 2.50 | 2.50 | — | — | — | 2.00 | — | — |
| Solvent, organic | | | | | | | | | | | | |
| 5.a. Total content of org. solvent | 25.20 | 24.20 | 24.20 | 24.20 | 24.20 | 24.20 | 17.70 | 17.70 | 16.70 | 14.70 | 12.70 | 13.70 |

TABLE 2

Properties of the coatings according to the invention on variation of the layer composition, at 160° C. PMT

| Properties | E 1 | E 2 | E 3 | E 4 | E 5 | E 6 | E 7 | E 8 |
|---|---|---|---|---|---|---|---|---|
| Dry film thickness in μm | 5 | 5 | 5 | 5 | 5 | 5 | 5 | 5 |
| Electrical conductivity of the coating | high | high | low | High | high | low | very low | very low |
| Elasticity of the coating in mm: cupping test acc. to DIN EN ISO 1520 | 9.2 | 9.0 | 8.6 | 8.8 | 9.0 | 8.4 | 7.8 | 8.4 |
| Mechanical strength of the coating | high | high | very high | very high | high | high | high | high |
| Gluability by the peel test with epoxy resin adhesive, visual: adhesive/cohesive fracture | 60/40 | 50/50 | 40/60 | 50/50 | 50/50 | 40/60 | 30/70 | 30/70 |
| Defects after shaping by bending over an edge | none | none | slight cracks | None | none | slight cracks | none | none |
| Defects on pressing | none | none | none | None | none | none | slight detachment | slight detachment |
| Tool wear on pressing | low | particularly low | particularly low | particularly low | particularly low | particularly low | low | low |

| Properties | CE 9 | CE 10 | CE 11 | CE 12 | E 13 | E 14 | E 15 | E 16 |
|---|---|---|---|---|---|---|---|---|
| Dry film thickness in μm | 5 | 5 | 5 | 5 | 5 | 5 | 5 | 5 |
| Electrical conductivity of the coating | very low | very low | very high | low | high | high | high | high |
| Elasticity of the coating in mm: cupping test acc. to DIN EN ISO 1520 | 8.6 | 8.5 | 8.8 | 7.8 | 9.4 | 9.0 | 8.4 | 8.2 |
| Mechanical strength of the coating | high | high | very high | very high | high | high | high | high |
| Gluability by the peel test with epoxy resin adhesive, visual: adhesive/cohesive fracture | 40/60 | 40/60 | 60/40 | 20/80 | 50/50 | 50/50 | 30/70 | 30/70 |
| Defects after shaping by bending over an edge | cracks | cracks | none | cracks | none | none | cracks | cracks |
| Defects on pressing | slight detachment | slight detachment | slight detachment | slight detachment | none | none | none | slight detachment |
| Tool wear on pressing | low | low | high | high | low | low | low | very low |

| Properties | E 17 | E 18 | CE 19 | E 20 | E 21 | E 22 | E 23 | E 24 |
|---|---|---|---|---|---|---|---|---|
| Dry film thickness in μm | 5 | 5 | 5 | 5 | 5 | 5 | 5 | 5 |
| Electrical conductivity of the coating | high | low | very low | very low | very low | very low | very high | very low |
| Elasticity of the coating in mm: cupping test acc. to DIN EN ISO 1520 | 9.0 | 7.9 | 6.9 | 7.2 | 6.6 | 6.2 | 9.0 | 5.6 |
| Mechanical strength of the coating | high | high | high | high | high | high | very high | low |
| Gluability by the peel test with epoxy resin | 40/60 | 30/70 | 30/70 | 30/70 | 20/80 | 20/80 | 50/50 | 30/70 |

TABLE 2-continued

Properties of the coatings according to the invention on variation of the layer composition, at 160° C. PMT

| | | | | | | | | |
|---|---|---|---|---|---|---|---|---|
| adhesive, visual: adhesive/cohesive fracture | | | | | | | | |
| Defects after shaping by bending over an edge | none | none | cracks | cracks | cracks | cracks | none | cracks |
| Defects on pressing | none | none | slight detachment | slight detachment | slight detachment | severe detachment | slight detachment | severe detachment |
| Tool wear on pressing | low | very low | high | low | low | low | high | high |

| Properties | CE 25 | E 26 | E 27 | E 28 | E 29 | E 30 | E 31 | CE 32 |
|---|---|---|---|---|---|---|---|---|
| Dry film thickness in μm | 5 | 5 | 5 | 5 | 5 | 5 | 5 | 5 |
| Electrical conductivity of the coating | high | high | high | Low | high | high | low | very low |
| Elasticity of the coating in mm: cupping test acc. to DIN EN ISO 1520 | 9.4 | 9.2 | 8.9 | 8.5 | 8.7 | 8.8 | 8.5 | 6.6 |
| Mechanical strength of the coating | high | high | high | Low | high | high | high | high |
| Gluability by the peel test with epoxy resin adhesive, visual: adhesive/cohesive fracture | 50/50 | 50/50 | 40/60 | 30/70 | 40/60 | 50/50 | 30/70 | 30/70 |
| Defects after shaping by bending over an edge | none | none | none | Cracks | none | none | cracks | cracks |
| Defects on pressing | none | none | none | slight detachment | none | none | slight detachment | slight detachment |
| Tool wear on pressing | high | low | very low | Low | very low | very low | very low | low |

| Properties | E 33 | E 34 | E 35 | E 36 | E 37 | E 38 | E 39 | E 40 |
|---|---|---|---|---|---|---|---|---|
| Dry film thickness in μm | 5 | 5 | 5 | 5 | 5 | 5 | 5 | 5 |
| Electrical conductivity of the coating | low | very high | very high | very low | low | high | high | high |
| Elasticity of the coating in mm: cupping test acc. to DIN EN ISO 1520 | 7.2 | 9.0 | 9.0 | 5.8 | 9.0 | 9.2 | 9.4 | 9.2 |
| Mechanical strength of the coating | high | high | high | low | high | high | high | high |
| Gluability by the peel test with epoxy resin adhesive, visual: adhesive/cohesive fracture | 30/70 | 50/50 | 40/60 | 20/80 | 50/50 | 50/50 | 50/50 | 50/50 |
| Defects after shaping by bending over an edge | cracks | none | cracks | cracks | none | none | none | none |
| Defects on pressing | slight detachment | none | slight detachment | severe detachment | none | none | none | none |
| Tool wear on pressing | low | low | low | low | low | low | low | very low |

| Properties | E 41 | E 42 | CE 43 | CE 44 | CE 45 | CE 46 | E 47 | CE 48 |
|---|---|---|---|---|---|---|---|---|
| Dry film thickness in μm | 5 | 5 | 5 | 5 | 5 | 5 | 5 | 5 |
| Electrical conductivity of the coating | high | high | very low | very low | very low | very low | very low | high |
| Elasticity of the coating in mm: cupping test acc. to DIN EN ISO 1520 | 9.0 | 8.8 | 9.6 | 9.6 | 9.2 | 9.0 | 9.0 | 9.4 |
| Mechanical strength of the coating | high | high | high | high | high | high | high | high |
| Gluability by the peel test with epoxy resin adhesive, visual: adhesive/cohesive fracture | 40/60 | 40/60 | 50/50 | 50/50 | 40/60 | 40/60 | 50/50 | 40/60 |
| Defects after shaping by bending over an edge | none | none | none | none | none | none | none | slight cracks |
| Defects on pressing | none | none | none | none | none | none | none | slight detachment |
| Tool wear on pressing | very low | very low | low | low | low | low | low | high |

TABLE 3

Properties of the coatings according to the invention on variation of the particle sizes, based on particular mixtures

| Properties | E 49 | E 50 | CE 51 | CE 52 | E 53 | E 54 | CE 55 | CE 56 | E 57 | E 58 | CE 59 | CE 60 |
|---|---|---|---|---|---|---|---|---|---|---|---|---|
| Composition | Mixture according to E 1 | | | | Mixture according to E 13 | | | | Mixture according to E 26 | | | |
| Content of el. conductive particles in wt. % | 57.50 | 57.50 | 57.50 | 57.50 | 56.50 | 56.50 | 56.50 | 56.50 | 55.00 | 55.00 | 55.00 | 55.00 |
| $d_{99}$ el. conductive particles, µm | 4 | 6 | 12 | 16 | 4 | 6 | 12 | 16 | 4 | 6 | 12 | 16 |
| $d_{50}$ el. conductive particles, µm | 1.5 | 2 | 3 | 3.5 | 1.5 | 2 | 3 | 3.5 | 1.5 | 2 | 3 | 3.5 |
| $d_{10}$ el. conductive particles, µm | 0.6 | 0.7 | 0.9 | 1.0 | 0.6 | 0.7 | 0.9 | 1.0 | 0.6 | 0.7 | 0.9 | 1.0 |
| Content of particles capable of sliding in wt. % | 1.00 | 1.00 | 1.00 | 1.00 | 1.00 | 1.00 | 1.00 | 1.00 | 1.00 | 1.00 | 1.00 | 1.00 |
| $d_{99}$ particles capable of sliding, µm | 20 | 20 | 20 | 20 | 20 | 20 | 20 | 20 | 20 | 20 | 20 | 20 |
| $d_{50}$ particles capable of sliding, µm | 8 | 8 | 8 | 8 | 8 | 8 | 8 | 8 | 8 | 8 | 8 | 8 |
| Dry film thickness in µm | 5 | 5 | 5 | 5 | 5 | 5 | 5 | 5 | 5 | 5 | 5 | 5 |
| Electrical conductivity of the coating | High | high | very high | very high | high | high | very high | very high | high | high | very high | very high |
| Elasticity of the coating in mm: cupping test acc. to DIN EN ISO 1520 | 9.2 | 9.4 | 9.6 | 9.6 | 9.4 | 9.6 | 9.6 | 9.6 | 9.2 | 9.6 | 9.6 | 9.6 |
| Mechanical strength of the coating | High | high | low | low | high | high | low | low | high | high | low | low |
| Gluability by the peel test with epoxy resin adhesive, visual: adhesive/cohesive fracture | 60/40 | 60/40 | 60/40 | 70/30 | 50/50 | 50/50 | 60/40 | 60/40 | 50/50 | 60/40 | 60/40 | 60/40 |
| Defects after shaping by bending over an edge | None | none | slight scratching | severe scratching | none | none | slight scratching | severe scratching | none | none | slight scratching | severe scratching |
| Defects on pressing | None | none | slight detachment | slight detachment | none | none | slight detachment | severe detachment | none | none | severe detachment | severe detachment |
| Tool wear on pressing | Low | low | high | very high | low | low | high | very high | low | low | high | very high |

| Properties | E 61 | E 62 | CE 63 | CE 64 | E 65 | E 66 | CE 67 | CE 68 | E 69 | E 70 | E 71 | E 72 |
|---|---|---|---|---|---|---|---|---|---|---|---|---|
| Composition | Mixture according to E 37 | | | | Mixture according to E 41 | | | | Mixture according to E 41 | | | |
| Content of el. conductive particles in wt. % | 28.00 | 28.00 | 28.00 | 28.00 | 45.00 | 45.00 | 45.00 | 45.00 | 45.00 | 45.00 | 45.00 | 45.00 |
| $d_{99}$ el. conductive particles, µm | 4 | 6 | 12 | 16 | 4 | 6 | 12 | 16 | 4 | 4 | 4 | 4 |
| $d_{50}$ el. conductive particles, µm | 1.5 | 2 | 3 | 3.5 | 1.5 | 2 | 3 | 3.5 | 1.5 | 1.5 | 1.5 | 1.5 |
| $d_{10}$ el. conductive particles, µm | 0.6 | 0.7 | 0.9 | 1.0 | 0.6 | 0.7 | 0.9 | 1.0 | 0.6 | 0.6 | 0.6 | 0.6 |
| Content of particles capable of sliding in wt. % | — | — | — | — | 2.00 | 2.00 | 2.00 | 2.00 | 2.00 | 2.00 | 2.00 | 2.00 |
| $d_{99}$ particles capable of sliding, µm | 20 | 20 | 20 | 20 | 20 | 20 | 20 | 20 | 20 | 15 | 20 | 15 |
| $d_{50}$ particles capable of sliding, µm | 8 | 8 | 8 | 8 | 8 | 8 | 8 | 8 | 8 | 7 | 8 | 7 |
| Content of zinc particles in wt. % | 28.00 | 28.00 | 28.00 | 28.00 | 10.00 | 10.00 | 10.00 | 10.00 | 10.00 | 10.00 | 10.00 | 10.00 |
| $D_{99}$ zinc particles, µm | 10 | 10 | 10 | 10 | 10 | 10 | 10 | 10 | 10 | 10 | 6 | 6 |
| $D_{50}$ zinc particles, µm | 4 | 4 | 4 | 4 | 4 | 4 | 4 | 4 | 4 | 4 | 2.5 | 2.5 |
| Dry film thickness in µm | 5 | 5 | 5 | 5 | 5 | 5 | 5 | 5 | 5 | 5 | 5 | 5 |
| Electrical conductivity of the coating | low | low | low | low | high | high | high | high | high | high | high | high |
| Elasticity of the coating in mm: cupping test acc. to DIN EN ISO 1520 | 9.0 | 9.0 | 9.2 | 9.2 | 9.0 | 9.0 | 9.2 | 9.3 | 9.0 | 9.0 | 8.8 | 8.8 |
| Mechanical strength of the coating | high | high | high | high | high | high | high | high | high | high | high | high |
| Gluability by the peel test with epoxy resin adhesive, visual: adhesive/cohesive fracture | 50/50 | 50/50 | 50/50 | 50/50 | 40/60 | 40/60 | 40/60 | 40/60 | 40/60 | 40/60 | 40/60 | 40/60 |

TABLE 3-continued

Properties of the coatings according to the invention on variation of the particle sizes, based on particular mixtures

| Defects after shaping by bending over an edge | none | none | slight scratching | severe scratching | none | none | slight scratching | severe scratching | none | none | none | none |
|---|---|---|---|---|---|---|---|---|---|---|---|---|
| Defects on pressing | none | none | slight detachment | severe detachment | none | none | slight detachment | severe detachment | none | none | none | none |
| Tool wear on pressing | low | low | high | very high | very low | low | high | very high | very low | very low | very low | very low |

TABLE 4

Measurement results on coated metal sheets according to substrate and coating.

| | E 73 | E 74 | CE 75 | E 76 | E 77 | E 78 | E 79 | E 80 | E 81 | E 82 |
|---|---|---|---|---|---|---|---|---|---|---|
| Substrate | Al | Al | Al | Steel | Steel | Steel | Steel | Steel | Steel | Steel |
| Sheet thickness mm | 1.2 | 1.2 | 1.2 | 1.45 | 0.75 | 0.75 | 0.75 | 0.75 | 0.75 | 0.75 |
| Zinc layer | — | — | — | ZE | ZE | ZE | ZE | ZE | ZE | ZE |
| Pretreatment layer | complex fluorides | complex fluorides | complex fluorides | complex fluoride-P | complex fluoride-P | complex fluoride-P | complex fluoride-P | complex fluoride-P | complex fluoride-P | complex fluoride-P |
| WPL application | one side | one side | one side | two sides | two sides | one side | one side | one side | one side | one side |
| WPL thickness μm | 5 | 5 | 5 | 5 | 5 | 5 | 5 | 5 | 5 | 5 |
| WPL particles A wt. % | 55 Fe phosphide | 50 Fe phosphide | 0 | 55 Fe phosphide | 55 Fe phosphide | 30 Fe phosphide | 30 Fe phosphide | 40 Fe phosphide | 55 Fe phosphide | 55 $Fe_3O_4$ |
| WPL particles B wt. % | 0.2 graphite | 5 graphite | 10 graphite | 1 graphite | 1 graphite | 1 graphite, 25 zinc | 1 graphite, 30 zinc | 1 graphite, 15 zinc | 2.5 $MoS_2$ | 1 graphite |
| WPL particles D wt. % | 2.5 Ca silicate | 2.5 Ca silicate | 2.5 Ca silicate | 5 Ca silicate | 5 Ca silicate | 3 Ca silicate | 3 Ca silicate | 5 Ca silicate | 5 Ca silicate | 5 Ca silicate |
| VR mΩ | 4.8 | 54.7 | 48.6 | 5.6 | 6.3 | 5.7 | 3.3 | 13.6 | 16.9 | 26.6 |
| VRs mΩ, ± | 0.5 | 8.4 | 7.8 | 0.2 | 0.5 | 0.9 | 0.6 | 4.2 | 9.4 | 2.1 |
| $R_a$ μm | 0.65 | 0.70 | 0.71 | 0.66 | 0.73 | 0.86 | 1.02 | 0.92 | 0.79 | 0.85 |
| $R_{3z}$ μm | 3.67 | 3.88 | 3.75 | 3.60 | 3.96 | 4.64 | 5.52 | 5.05 | 4.14 | 4.26 |
| $R_{max}$ μm | 4.86 | 5.65 | 5.49 | 5.32 | 7.14 | 6.87 | 7.66 | 7.26 | 6.00 | 6.46 |
| Shapability | n.d. | n.d. | n.d. | not very good | not very good | good to very good | good to very good | Good | not very good | good |
| Weldability | n.d. | n.d. | n.d. | good to very good | good to very good | good to very good | very good | not very good | not very good | satisfactory |

WPL = welding primer layer.
VR = volume resistance. VRs = standard deviation of the volume resistance measurement series.

The invention claimed is:

1. A mixture comprising:
   at least one substance A in the form of electrically conductive hard particle having a Mohs hardness of at least 5.5;
   at least one substance B in the form of very soft or soft, inorganic, electrically conductive or semiconducting particle which are capable of sliding,
   at least one substance C in the form of a metallic, soft or hard, electrically conductive or semiconducting particle or carbon black;
   at least one binder; and
   at least one of a crosslinking agent or a photoinitiator, one additive, one corrosion protection pigment D, one corrosion inhibitor which is not present in particle form; and at least one of an organic solvent or water,
   wherein A, B and C are water-insoluble or sparingly water-soluble pigments, wherein the sum of the weight contents of the at least one substance B and the at least one substance C makes up 0.25 to 99.5% of the weight content of the water-insoluble or sparingly water-soluble pigmentation Σ(A+B+C), and the particle size substance A, based on the particle size transfer value $d_{99}$ measured with a Mastersizer of type S from Malvern Instruments, is less than 10 μm, and wherein said Σ(A+B+C) relative to the sum of the total pigmentation Σ(A+B+C +D) is 30 wt. %.

2. A mixture according to claim 1, wherein the mixture of all the types of electrically conductive hard particles A has an average particle size $d_{50}$ of from 0.1 to 2.5 microns.

3. A mixture according to claim 1, wherein the mixture of all the types of electrically conductive hard particles A has an average particle size $d_{50}$ of from 0.2 to 2 microns.

4. mixture according to claim 1, wherein the mixture of all the types of electrically conductive hard particles A has an average particle size $d_{50}$ of from 0.2 to 2.5 microns.

5. A process comprising applying the mixture of claim 2 to a substrate.

6. A process comprising applying the mixture of claim 3 to a substrate.

7. A process comprising applying the mixture of claim 4 to a substrate.

8. A process comprising applying the mixture of claim 1 to a substrate.

* * * * *